United States Patent
Cong et al.

(10) Patent No.: US 11,162,198 B2
(45) Date of Patent: Nov. 2, 2021

(54) METHOD OF WHOLE GARMENT KNITTING IN HORIZONTAL DIRECTION ALONG THE BACK CENTER

(71) Applicant: Jiangnan University, Wuxi (CN)

(72) Inventors: Honglian Cong, Nuxi (CN); Gaoming Jiang, Nuxi (CN); Zhijia Dong, Nuxi (CN); Zhe Gao, Nuxi (CN); Bo Liu, Nuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/136,360

(22) Filed: Dec. 29, 2020

(65) Prior Publication Data
US 2021/0115602 A1 Apr. 22, 2021

Related U.S. Application Data

(63) Continuation of application No. PCT/CN2020/097986, filed on Jun. 24, 2020.

(30) Foreign Application Priority Data

Sep. 23, 2019 (CN) .......................... 201910898262.7

(51) Int. Cl.
*D04B 1/24* (2006.01)
*D04B 7/30* (2006.01)
*D04B 15/36* (2006.01)

(52) U.S. Cl.
CPC .............. *D04B 1/246* (2013.01); *D04B 7/30* (2013.01); *D04B 15/36* (2013.01); *D10B 2501/04* (2013.01)

(58) Field of Classification Search
CPC .......... D04B 1/246; D04B 7/30; D04B 15/36; D04B 1/22; D04B 1/24; D04B 9/42; D04B 11/36
(Continued)

(56) References Cited

U.S. PATENT DOCUMENTS 294,637 A * 3/1884 Kreisel ..................... A41D 1/04
2/90
3,057,178 A * 10/1962 Ellaj ....................... A41D 1/04
66/176
(Continued)

FOREIGN PATENT DOCUMENTS

CN 202047203 U 11/2011
CN 109259365 A 1/2019
(Continued)

*Primary Examiner* — Danny Worrell
(74) *Attorney, Agent, or Firm* — IPRO, PLLC; Na Xu

(57) ABSTRACT

The disclosure discloses a method of whole garment knitting in horizontal direction along the back center, and belongs to the technical field of knitted fabrics. The method can be used for directly knitting an integrally shaped left piece and right piece, wherein a sleeve, a front body, a back body, a front placket, a lapel and a lapel collar of the left piece or the right piece are all integrally shaped, and can be directly sewn at back center lines and collar center lines through a looper to form a fully-shaped upper garment including plackets and a collar portion. According to the solution, the knitting process is simple, manual or single yarn lifting sewing is not needed, and the garment knitting efficiency is improved. Moreover, the lapel collar and the plackets of the fabric knitted according to the solution are all of double-side double-layer structures, so that the thickness and stiffness are greater than those of the body; and the single yarn lifting sewing at the left side seams, right side seams and armholes is not needed, so that the texture of the fabric is improved.

7 Claims, 3 Drawing Sheets

(58) Field of Classification Search
USPC .......................................................... 66/176
See application file for complete search history.

(56) References Cited

U.S. PATENT DOCUMENTS

| | | | | |
|---|---|---|---|---|
| 3,605,452 A | | 9/1971 | Carter et al. | |
| 3,635,051 A | * | 1/1972 | Betts | D04B 1/246 66/128 |
| 3,695,063 A | * | 10/1972 | Betts | D04B 1/246 66/176 |
| 3,882,697 A | * | 5/1975 | Betts | D04B 15/54 66/176 |
| 4,102,155 A | * | 7/1978 | Robinson | D04B 1/246 66/176 |
| 4,107,955 A | * | 8/1978 | Robinson | D04B 1/246 66/176 |
| 4,111,009 A | * | 9/1978 | Robinson | D04B 1/246 2/90 |
| 4,197,724 A | * | 4/1980 | Robinson | D04B 1/24 66/176 |
| 4,300,365 A | * | 11/1981 | Robinson | D04B 1/24 66/176 |
| 4,398,402 A | * | 8/1983 | Robinson | D04B 1/246 66/176 |
| 5,826,445 A | * | 10/1998 | Okamoto | D04B 1/246 66/70 |
| 6,651,462 B2 | * | 11/2003 | Okamoto | D04B 1/24 66/64 |
| 6,655,175 B1 | * | 12/2003 | Okamoto | D04B 1/246 66/69 |
| 6,658,899 B2 | * | 12/2003 | Okamoto | D04B 1/246 66/176 |
| 6,748,770 B2 | * | 6/2004 | Okamoto | D04B 1/24 66/64 |
| 6,766,666 B2 | * | 7/2004 | Okamoto | D04B 1/24 66/64 |
| 6,766,667 B2 | * | 7/2004 | Dohtsu | D04B 1/106 66/69 |
| 6,935,140 B2 | * | 8/2005 | Okamoto | D04B 1/106 66/176 |
| 7,143,613 B2 | * | 12/2006 | Takimoto | A41D 1/04 66/64 |
| 2009/0308108 A1 | * | 12/2009 | Okamoto | D04B 1/246 66/176 |

FOREIGN PATENT DOCUMENTS

| | | |
|---|---|---|
| CN | 110512343 A | 11/2019 |
| EP | 0863238 A2 | 9/1998 |
| GB | 1495266 A | 12/1977 |
| JP | H0457943 A | 2/1992 |
| JP | 2006152507 A | 6/2006 |
| JP | 2009068118 A | 4/2009 |

\* cited by examiner

METHOD OF WHOLE GARMENT KNITTING IN HORIZONTAL DIRECTION ALONG THE BACK CENTER

TECHNICAL FIELD

The disclosure relates to a method of whole garment knitting in horizontal direction along the back center, and belongs to the technical field of knitted fabrics.

BACKGROUND

According to a traditional method for knitting a fabric, a whole piece of knitted cloth is firstly cut according to the size of each portion of the fabric, and then all portions are sewn to obtain the complete fabric. For example, in a preparation process of a knitted garment, a whole piece of cloth is firstly knitted, then the cloth is cut according to the size of each portion of the garment, and finally, all portions are sewn to obtain the complete garment. For garments with complex structures, for example, garments with plackets and a collar center line, such as western-style clothes, according to traditional ideas, a whole piece of cloth is cut after being knitted, and then the pieces are manually sewn.

According to the above technical solution, labor is wasted, and at the same time, cut leftovers are difficult to be applied to other garments, so that the waste of cloth is caused.

In order to solve the above problems, a production process of the garment is regulated to a process from a sample garment to knitting to sewing. That is, each constituent portion of the garment is knitted according to the size of the sample garment, and then, all portions are sewn to further form the garment. Although this solution reduces the cloth waste problem to a certain degree, each piece of the knitted fabric, such as a left front piece, a left back piece, a right front piece, a right back piece, a left sleeve piece and a right sleeve piece of an upper garment is firstly knitted, then, all of the above pieces are manually sewn, and the work still needs great labor consumption.

Based on the above, in the prior art, the technical solution of knitting an upper garment with a collar in a way of saving the labor and materials is needed.

SUMMARY

In order to solve the technical problem that the technical solution of knitting an upper garment with a collar in a way of saving labor and materials lacks in the prior art, the disclosure provides a method of whole garment knitting in horizontal direction along the back center. The method is used for knitting an upper garment with a collar in a transverse knitting mode, and includes:

knitting a fully-shaped left piece of the upper garment on a flat knitting machine, and knitting a fully-shaped right piece of the upper garment on the flat knitting machine, wherein the left piece and the right piece respectively include sleeve pieces and collar portions corresponding to the left piece and the right piece; and respectively sewing the left piece and the right piece at back center lines and collar center lines.

The flat knitting machine at least includes a pair of needle beds extending in left and right directions and disposed in a way of being opposite to each other at front and back sides, and at least one of the needle beds is able to leftwards and rightwards move, and transfer loops between the two needle beds.

The step of knitting the fully-shaped left piece of the upper garment on the flat knitting machine includes:

knitting a left collar portion and a garment portion at the lower side of the left collar portion on the flat knitting machine in an open knitting mode, wherein the garment portion at the lower side of the left collar portion includes a placket;

knitting a left shoulder portion and a garment portion at the lower side of the left shoulder portion on the flat knitting machine in a semi-open knitting mode, wherein the garment portion at the lower side of the left shoulder portion includes a left armhole; and knitting the left sleeve piece in a tubular knitting mode from the armhole.

Optionally, the step of knitting the left collar portion and the garment portion at the lower side of the left collar portion on the flat knitting machine in the open knitting mode includes:

casting on from the placket, and according to a direction from the placket to a left side seam, transversely knitting to form a first portion of the left front piece; and casting on from the back center line, and according to a direction from the back center line to the left side seam, transversely knitting to form a second portion of the left back piece.

The step of knitting the left shoulder portion and the garment portion at the lower side of the left shoulder portion on the flat knitting machine in the semi-open knitting mode includes:

connecting an edge of the first portion far away from the placket to an edge of the second portion far away from the back center line, and according to the direction from the back center line to the left side seam, knitting the left shoulder portion and the garment portion at the lower side of the left shoulder portion in the semi-open knitting mode.

Optionally, the step of casting on from the placket, and according to the direction from the placket to the left side seam, transversely knitting to form the first portion of the left front piece includes:

casting on from the placket on a front needle bed of the pair of needle beds, and according to the direction from the placket to the left side seam, transversely knitting to form the first portion of the left front piece.

The step of casting on from the back center line, and according to the direction from the back center line to the left side seam, transversely knitting to form the second portion of the left back piece includes:

casting on from the back center line on a back needle bed of the pair of needle beds, and according to the direction from the back center line to the left side seam, transversely knitting to form the second portion of the left back piece.

Optionally, the step of knitting the left sleeve piece in the tubular knitting mode from the armhole includes:

knitting a front piece of the left sleeve piece on the front needle bed of the pair of needle beds from the armhole according to a direction from a sleeve top to a sleeve opening; and knitting a back piece of the left sleeve piece by using the same yarn carrier on the back needle bed of the pair of needle beds from the armhole according to the direction from the sleeve top to the sleeve opening;

wherein, when the knitting reaches a sleeve seam during knitting of the back piece of the left sleeve piece, the back piece of the left sleeve piece is sewn with the front piece of the left sleeve piece at the sleeve seam.

Optionally, the step of knitting the fully-shaped right piece of the upper garment on the flat knitting machine includes:

knitting a right collar portion and a garment portion at the lower side of the right collar portion on the flat knitting machine in an open knitting mode, wherein the garment portion at the lower side of the right collar portion includes a placket;

knitting a right shoulder portion and a garment portion at the lower side of the right shoulder portion on the flat knitting machine in a semi-open knitting mode, wherein the garment portion at the lower side of the right shoulder portion includes a right armhole; and knitting a right sleeve piece in a tubular knitting mode from the armhole.

Optionally, the step of knitting the right sleeve piece in the tubular knitting mode from the armhole further includes:

knitting a front piece of the right sleeve piece by using the same yarn carrier on the back needle bed of the pair of needle beds from the armhole according to a direction from a sleeve top to a sleeve opening; and knitting a back piece of the right sleeve piece on the front needle bed of the pair of needle beds from the armhole according to the direction from the sleeve top to the sleeve opening;

wherein, when the knitting reaches a sleeve seam during knitting of the back piece of the right sleeve piece, the back piece of the right sleeve piece is sewn with the front piece of the right sleeve piece at the sleeve seam.

Optionally, the step of respectively sewing the left piece and the right piece at the back center lines and the collar center lines includes:

sewing the back center line of the left piece and the back center line of the right piece to form a garment portion;

sewing a front collar of the left piece and a back collar of the left piece at the left side seam of the collar to form a collar of the left piece;

sewing a front collar of the right piece and a back collar of the right piece at the right side seam of the collar to form a collar of the right piece; and sewing the collar of the left piece and the collar of the right piece at the collar center line of the collar to form the collar.

The disclosure further provides a fabric of whole garment knitting in horizontal direction along the back center. The fabric of whole garment knitting in horizontal direction along the back center is prepared by using the above method. The fabric of whole garment knitting in horizontal direction along the back center is a garment including plackets and a collar center line.

Optionally, the fully-shaped transverse separate piece knitted fabric along the back center includes:

a fully-shaped left piece and a fully-shaped right piece.

The fully-shaped left piece and the fully-shaped right piece are sewn at back center lines and collar center lines.

The left piece and the right piece respectively include sleeve pieces and collar portions corresponding to the left piece and the right piece.

The disclosure has the following beneficial effects:

The method of whole garment knitting in horizontal direction along the back center provided by the disclosure can be used for directly knitting an integrally shaped left piece and right piece. A sleeve, a front body, a back body, a front placket, a lapel and a lapel collar of the left piece or the right piece are all integrally shaped, and can be directly sewn at the back center lines and the collar center lines through a looper to form a fully-shaped upper garment including the plackets and the collar portion. According to the solution, the knitting process is simple, manual or single yarn lifting sewing is not needed, and the garment knitting efficiency is improved. Moreover, the lapel collar and the plackets of the fabric knitted according to the solution are all of double-side double-layer structures, so that the thickness and stiffness are greater than those of the body; and the single yarn lifting sewing at the left side seams, right side seams and armholes is not needed, so that the texture of the fabric is improved.

BRIEF DESCRIPTION OF FIGURES

In order to more clearly illustrate the technical solutions of the examples of the disclosure, the drawings used in the description of the examples are briefly described below, and it is obvious that the drawings in the description below are only some examples of the present disclosure, and a person of ordinary skill in the art can obtain other drawings from these drawings without any creative effort.

DETAILED DESCRIPTION

For the purpose of making the objectives, technical solution and advantages of the disclosure more clear, clear and complete description will be made to the technical solutions of the disclosure in conjunction with specific examples and corresponding drawings of the disclosure. Obviously, the described examples are merely a part of examples of the disclosure and not all the examples. All of other examples obtained by a person of ordinary skill in the art on the basis of examples of the disclosure without any creative effort will fall within the protection scope of the disclosure.

The technical solution provided by each example of the disclosure will be illustrated in detail in conjunction with drawings hereafter.

Example 1

Figure 1:
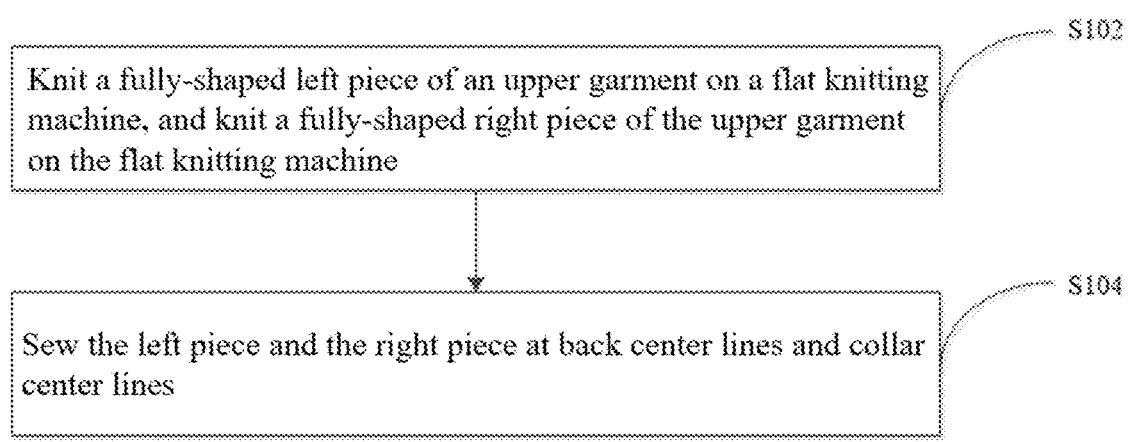
FIG. 1 is a flow diagram of a transverse back center line piece connection knitting method provided by an example of the disclosure.

Referring to FIG. 1, the example of the disclosure provides a method of whole garment knitting in horizontal direction along the back center. A flat knitting machine used in the method at least includes a pair of needle beds extending in left and right directions and disposed in a way of being opposite to each other at front and back sides, and at least one of the needle beds is able to leftwards and rightwards move, and transfer loops between the two needle beds. The method includes the following steps:

Step S102: A fully-shaped left piece of an upper garment is knitted on the flat knitting machine, and a fully-shaped right piece of the upper garment is knitted on the flat knitting machine. The left piece and the right piece respectively include sleeve pieces and collar portions corresponding to the left piece and the right piece.

Figure 2:
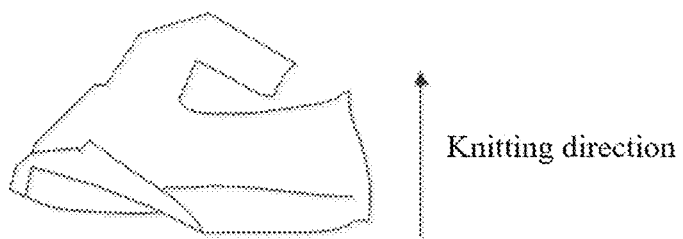
FIG. 2 is a schematic diagram of a knitting direction used in the transverse back center line piece connection knitting method provided by an example of the disclosure.

Referring to FIG. 2, the method provided by the example of the disclosure uses transverse knitting according to a knitting direction from a placket to a side seam. The integrally shaped left piece and right piece can be knitted on the flat knitting machine. Each portion of the left piece does not need single yarn lifting or single sewing by implementing a sewing process to form the left piece, and at the same time, each portion of the right piece does not need single yarn lifting or single sewing by implementing a sewing process to form the right piece.

Therefore, the solution overcomes the problem of waste of labor, materials and time caused by single sewing to form each portion of the upper garment in the prior art.

Step S104: The left piece and the right piece are sewn at back center lines and collar center lines.

In the example of the disclosure, after the fully-shaped left piece and the fully-shaped right piece are knitted, the left piece and the right piece can be sewn at the back center lines in a looping mode, and the left piece and the right piece can be sewn at the collar center lines in a looping mode. Therefore, the integrally shaped left piece and right piece can be fast sewn to form the upper garment including the collar center line and/or the placket.

The flat knitting machine at least includes a pair of needle beds extending in left and right directions and disposed in a way of being opposite to each other at front and back sides, each needle bed includes at least two needles, and at least one of the needle beds is able to leftwards and rightwards move, and transfer loops between the two needle beds.

Through the solution, the knitted left piece and the knitted right piece of the upper garment only need to be sewn at back center lines and collar center lines through a looper, and manual sewing is not needed, so that the consumption of labor, materials and time is reduced, and the knitting efficiency is improved.

The step of knitting the fully-shaped left piece of the upper garment on the flat knitting machine includes:

1) A left collar portion and a garment portion at the lower side of the left collar portion are knitted on the flat knitting machine in an open knitting mode. The garment portion at the lower side of the left collar portion includes a placket.

In the example of the disclosure, firstly, casting on can be performed from the placket, transverse knitting is performed according to a direction from the placket to a left side seam to form a first portion of the left front piece. It is pointed out that the left front piece is a left garment portion from the placket to the left side seam, and includes a left placket.

Then, casting on is performed from the back center line, and transverse knitting is performed according to a direction from the back center line to the left side seam to form a second portion of the left back piece. The second portion of the left back piece refers to a collar portion and a left back piece portion at the lower side of the left collar portion.

2) A left shoulder portion and a garment portion at the lower side of the left shoulder portion are knitted on the flat knitting machine in a semi-open knitting mode. The garment portion at the lower side of the left shoulder portion includes a left armhole.

In the example of the disclosure, after the left collar portion and the garment portion at the lower side of the left collar portion are knitted, the garment portion at the lower side of the left shoulder portion is leftwards knitted continuously. At this moment, the left shoulder portion of the garment portion about to be knitted is sewn, an edge of the first portion far away from the placket is combined with an edge of the second portion far away from the back center line at the left shoulder, and lower hems need to be separated, so that the garment portion at the lower side of the left shoulder portion can be continuously knitted in a direction towards the left side seam in a semi-open knitting mode.

3) The left sleeve piece is knitted in a tubular knitting mode from the armhole.

In the example of the disclosure, after the left garment portion including the armhole is knitted, casting on is performed from the armhole, and the left sleeve piece is knitted in a tubular knitting mode according to a direction from a sleeve top to a sleeve opening.

In the example of the disclosure, the needle beds include a front needle bed and a back needle bed. The step of transverse knitting according to the direction from the placket to the left side seam to form the left front piece includes:

transversely knitting on the front needle bed of the pair of needle beds according to a direction from the placket to the left side seam to form the left front piece.

The step of transverse knitting according to the direction from the back center line to the left side seam to form the right front piece includes:

transversely knitting on the back needle bed of the pair of needle beds according to a direction from the back center line to the left side seam to form the left back piece.

Correspondingly, in the example of the disclosure, when the right piece is formed through transverse knitting, the right back piece can be formed through knitting on the front needle bed of the pair of needle beds, and the right front piece can be formed on the back needle bed of the pair of needle beds through knitting. The knitting direction of the right front piece is the direction from the placket to the right side seam, and the knitting direction of the right back piece is the direction from the back center line to the right side seam. Specifically, the left sleeve can be knitted after the garment portion of the left piece is knitted, and then, the garment portion of the right piece and the right sleeve piece are knitted.

In the example of the disclosure, the step of knitting the left sleeve piece in the tubular knitting mode from the armhole includes:

1) A front piece of the left sleeve piece is knitted on the front needle bed of the pair of needle beds from the armhole according to a direction from a sleeve top to a sleeve opening. The sleeve top is a portion of the sleeve piece connected with the armhole.

2) A back piece of the left sleeve piece is knitted by using the same yarn carrier on the back needle bed of the pair of needle beds from the armhole according to the direction from the sleeve top to the sleeve opening.

When the knitting reaches a sleeve seam during knitting of the back piece of the left sleeve piece, the back piece of the left sleeve piece is sewn with the front piece of the left sleeve piece at the sleeve seam.

Figure 3:
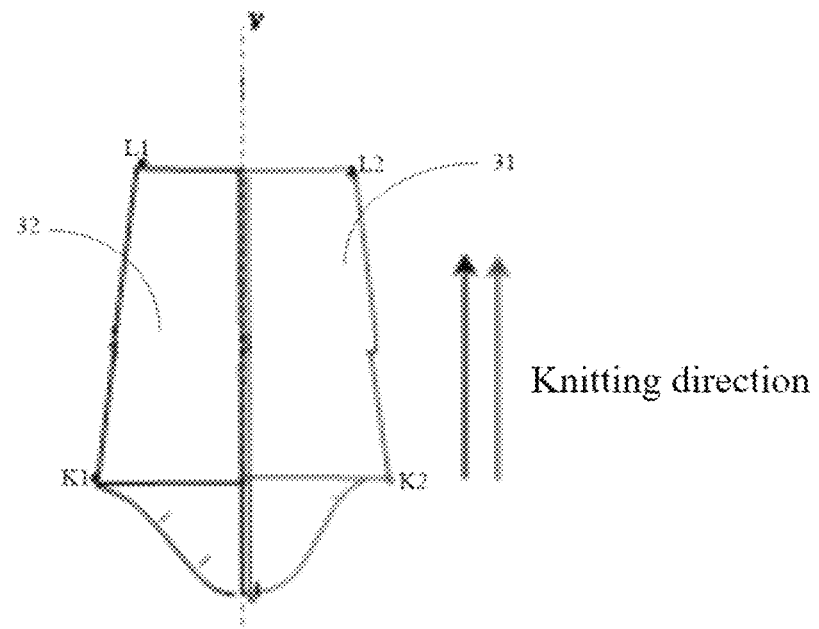
FIG. 3 is a schematic diagram of a knitting process of a left sleeve piece of the transverse back center line piece connection knitting method provided by an example of the disclosure.

Specifically referring to FIG. 3, when the knitting reaches the sleeve seam during knitting of the back piece 32 of the left sleeve piece, the back piece is sewn with the front piece 31 of the left sleeve piece at the sleeve seam. For example, when the knitting reaches $K_1L_1$ during knitting of the back piece 32 of the left sleeve piece, the back piece is sewn with a corresponding position on $K_2L_2$. For example, when knitting reaches $L_1$, the back piece is directly sewn with $L_2$; when knitting reaches $K_1$, the back piece is directly sewn with $K_2$. It is pointed out herein that the single yarn lifting is not needed for the knitting here, and the back piece 32 of the left sleeve piece is directly knitted with the front piece 31 during knitting. It is pointed out herein that in the example of the disclosure, the back piece 32 of the left sleeve piece can be knitted after the front piece 31 of the left sleeve piece is knitted. According to a specific method, the knitted left front piece can be reversed, and then, the back piece 32 of the left sleeve piece is continuously started from a sleeve center line v.

Correspondingly, in the example of the disclosure, the step of knitting the right sleeve piece in the tubular knitting mode from the armhole includes:

1) A front piece of the right sleeve piece is knitted by using the same yarn carrier on the back needle bed of the pair of needle beds from the armhole according to a direction from a sleeve top to a sleeve opening.

2) A back piece of the right sleeve piece is knitted on the front needle bed of the pair of needle beds from the armhole according to the direction from the sleeve top to the sleeve opening. The sleeve top is a portion of the sleeve piece connected with the armhole.

When the knitting reaches a sleeve seam during knitting of the back piece of the right sleeve piece, the back piece of the right sleeve piece is sewn with the front piece of the right sleeve piece at the sleeve seam.

In the example of the disclosure, a mode of knitting the right sleeve piece and a mode of sewing the front piece and the back piece of the right sleeve piece are the same as those of the left sleeve piece, so it is not repeated herein.

The step of knitting the fully-shaped right piece of the upper garment on the flat knitting machine includes:

1) A right collar portion and a garment portion at the lower side of the right collar portion are knitted on the flat knitting machine in an open knitting mode. The garment portion at the lower side of the right collar portion includes a placket.

2) A right shoulder portion and a garment portion at the lower side of the right shoulder portion are knitted on the flat knitting machine in a semi-open knitting mode. The garment portion at the lower side of the right shoulder portion includes a right armhole.

3) A right sleeve piece is knitted in a tubular knitting mode from the armhole.

According to the method provided by the example of the disclosure, a method of knitting the fully-shaped right piece of the upper garment on the flat knitting machine is similar to the method of knitting the fully-shaped left piece of the upper garment on the flat knitting machine, the method of knitting the left piece of the upper garment on the flat knitting machine has been illustrated in detail above, so the method of knitting the right piece of the upper garment on the flat knitting machine is not repeated herein.

In the example of the disclosure, Step S104 includes:

Step S1042: The back center line of the left piece and the back center line of the right piece are sewn to form a garment portion.

In the example of the disclosure, the fully-shaped left piece and the fully-shaped right piece are sewn at the back center lines. A sewing process uses a loop sewing mode, the sewing process is simple, and the sewing efficiency is high.

Step S1044: A front collar of the left piece and a back collar of the left piece are sewn at the left side seam of the collar to form the collar of the left piece.

In the example of the disclosure, the fully-shaped left piece includes a front collar portion of the left side collar and a back collar portion of the left side collar. However, the front collar portion of the left side collar and the back collar portion of the left side collar in the left piece knitted by the flat knitting machine are not sewn together. Herein, the front collar portion and the back collar portion in the left piece can still be sewn at the left side seam of the collar in a loop sewing mode. On the basis of linear sewing, sewing in a loop sewing mode by a looper can still be directly adopted, and manual sewing is not needed. The sewing process is simple, and the sewing efficiency is high.

Step S1046: A front collar of the right piece and a back collar of the right piece are sewn at the right side seam of the collar to form a collar of the right piece.

Similar to the fully-shaped left piece, the fully-shaped right piece also includes a front collar portion and a back collar portion. However, the front collar portion and the back collar portion are not sewn together. Herein, the front collar portion and the back collar portion of the right piece can still be sewn at the right side seam of the collar in a loop sewing mode. On the basis of linear sewing, sewing in a loop sewing mode by a looper can still be directly adopted, and manual sewing is not needed. The sewing process is simple, and the sewing efficiency is high.

Step S1048: The collar of the left piece and the collar of the right piece are sewn at the back center line of the collar to form the collar.

In the example of the disclosure, the fully-shaped left piece includes the left collar portion, and the fully-shaped right piece includes the right collar portion. In the sewing process after the left piece and the right piece are knitted, the collar of the left piece and the collar of the right piece can be sewn at the back center lines to form the collar of the knitted fabric (upper garment).

Example 2

Figure 4:
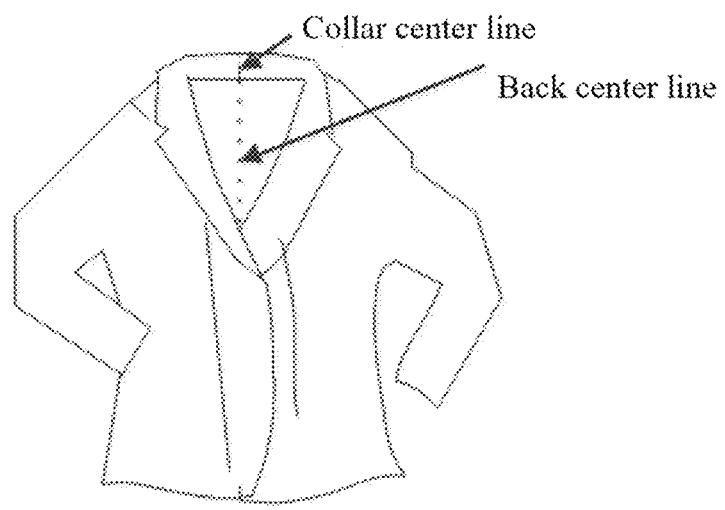
FIG. 4 is a schematic structural diagram of a knitted fabric provided by an example of the disclosure.
Figure 5A:
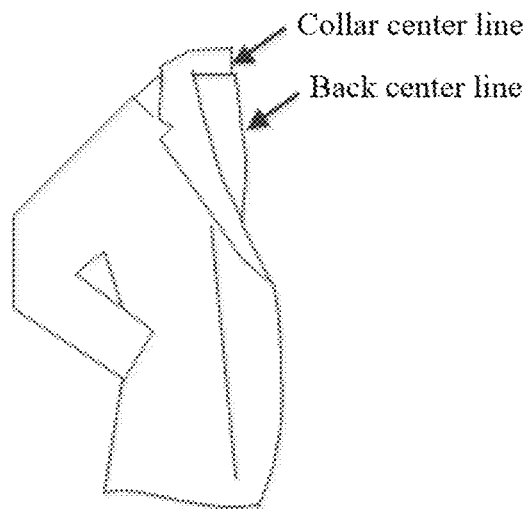
FIG. 5A is a schematic structural diagram of a fully-shaped right piece of the knitted fabric provided by an example of the disclosure.
Figure 5B:
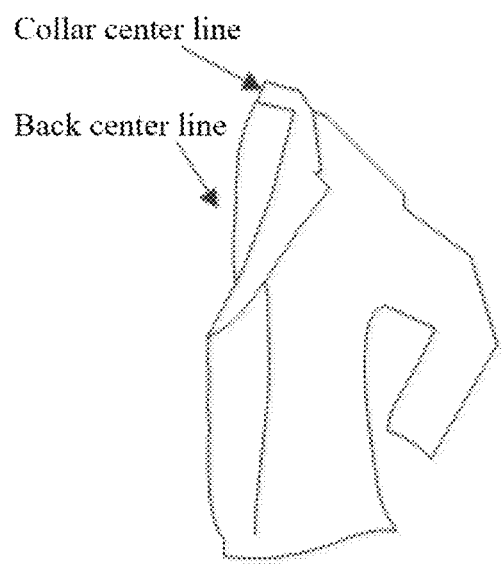
FIG. 5B is a schematic structural diagram of a fully-shaped left piece of the knitted fabric provided by an example of the disclosure.

Referring to FIG. 4, the example of the disclosure provides a fabric of whole garment knitting in horizontal direction along the back center. The fabric of whole garment knitting in horizontal direction along the back center is knitted by the method according to Example 1, is a garment including plackets and a collar center line, and includes:

a fully-shaped left piece and a fully-shaped right piece. The schematic structural diagram of the fully-shaped left piece is as shown in FIG. 5B. The schematic structural diagram of the fully-shaped right piece is as shown in FIG. 5A. The left piece and the right piece include sleeve pieces and collar portions corresponding to the left piece and the right piece.

The fully-shaped left piece and the fully-shaped right piece are sewn at the back center lines and the collar center lines.

The fully-shaped left piece and the fully-shaped right piece are both knitted on a flat knitting machine. The flat knitting machine at least includes a pair of needle beds extending in left and right directions and disposed in a way of being opposite to each other at front and back sides, and at least one of the needle beds is able to leftwards and rightwards move, and transfer loops between the two needle beds.

The knitted fabric provided by the example of the disclosure includes the fully-shaped left piece and the fully-shaped right piece. The fully-shaped left piece includes a left sleeve piece and a left collar portion. The fully-shaped right piece includes a right sleeve piece and a right collar portion. The fabric of whole garment knitting in horizontal direction along the back center provided by the disclosure only needs sewing at the back center lines and the collar center lines by a looper, the single yarn lifting sewing at a left side seam, a right side seam and an armhole is not needed, and the texture of the fabric is effectively improved.

In the example of the disclosure, the fully-shaped left piece and the fully-shaped right piece are directly knitted on the flat knitting machine, and a manual sewing or single yarn lifting sewing process is not needed in the middle procedure.

It could be seen that the fabric of whole garment knitting in horizontal direction along the back center provided by the example of the disclosure is a garment (upper garment) knitted by the fully-shaped transverse separate piece knitting method along the back center provided by Example 1. Therefore, the transverse knitted fabric along the back center line provided by the example of the disclosure is a product example corresponding to the above method example, so that the technical solution disclosed in the above example is also applicable to the product example, and it is not repeated herein.

The fabric of whole garment knitting in horizontal direction along the back center provided by the example of the disclosure consists of the fully-shaped left piece and the fully-shaped right piece. The fully-shaped left piece and the fully-shaped right piece are knitted on the flat knitting machine, manual sewing or single yarn lifting sewing is not needed, and the knitting efficiency of the upper garment with the collar portion is effectively improved.

It should be explained that in the example of the disclosure, term "connection" can be direct connection, can also be indirect connection, can be connection through a conductor, and can also be connection through other connection structures, such as hoses. It is not specifically limited in the solution.

Also it should be explained that terms "include", "comprise" or any other variations thereof herein are intended to contain non-exclusive inclusion, so that processes, methods, articles or equipment including a series of elements not only include those elements, but also include other elements which are not clearly listed, or also include inherent elements of the processes, methods, articles or equipment. The elements defined by a statement "include a . . . " shall not exclude the condition that other same elements also exist in the processes, methods, articles or equipment including the articles under the condition that no more restraints are required.

Illumination on the technical solution of the disclosure is only performed by a preferred example. However, a person of ordinary skill in the art can make changes on the specific implementations and the application scope according to the solution of the example of the disclosure. Therefore, based on the above, the contents of the description shall not be interpreted as the limitation to the disclosure. All modifications, equivalent replacement, improvement, etc. made within the spirit and the principle of the disclosure shall be included in the scope of claims of the disclosure.

What is claimed is:

1. A method of whole garment knitting in horizontal direction along a back center, wherein the method is used for knitting an upper garment with a collar portion in a transverse knitting mode, and comprises:
    knitting a fully-shaped left piece of the upper garment on a flat knitting machine, and knitting a fully-shaped right piece of the upper garment on the flat knitting machine, wherein the fully-shaped left piece and fully-shaped the right piece respectively comprise sleeve pieces and collar portions corresponding to the left piece and the right piece; and
    respectively sewing the left piece and the right piece at back center lines and collar center lines;
    the flat knitting machine at least comprises a pair of needle beds extending in left and right directions and disposed in a way of being opposite to each other at front and back sides, and at least one of the needle beds is able to leftwards and rightwards move, and transfer loops between the two needle beds; and
    the step of knitting the fully-shaped left piece of the upper garment on the flat knitting machine comprises:
    knitting a left collar portion and a garment portion at a lower side of the left collar portion on the flat knitting machine in an open knitting mode, wherein the garment portion at the lower side of the left collar portion comprises a placket;
    knitting a left shoulder portion and a garment portion at the lower side of the left shoulder portion on the flat knitting machine in a semi-open knitting mode, wherein the garment portion at the lower side of the left shoulder portion comprises a left armhole; and
    knitting a left sleeve piece in a tubular knitting mode from the left armhole.

2. The method according to claim 1, wherein the step of knitting the left collar portion and the garment portion at the lower side of the left collar portion on the flat knitting machine in the open knitting mode comprises:
    casting on from the placket, and according to a direction from the placket to a left side seam, transversely knitting to form a first portion of a left front piece; and
    casting on from a back center line, and according to a direction from the back center line to the left side seam, transversely knitting to form a second portion of a left back piece; and
    the step of knitting the left shoulder portion and the garment portion at the lower side of the left shoulder portion on the flat knitting machine in the semi-open knitting mode comprises:
    connecting an edge of the first portion far away from the placket to an edge of the second portion far away from the back center line, and according to the direction from the back center line to the left side seam, knitting the left shoulder portion and the garment portion at the lower side of the left shoulder portion in the semi-open knitting mode.

3. The method according to claim 2, wherein the step of casting on from the placket, and according to the direction from the placket to the left side seam, transversely knitting to form the first portion of the left front piece comprises:
    casting on from the placket on a front needle bed of the pair of needle beds, and according to the direction from the placket to the left side seam, transversely knitting to form the first portion of the left front piece; and
    the step of casting on from the back center line, and according to the direction from the back center line to the left side seam, transversely knitting to form the second portion of the left back piece comprises:
    casting on from the back center line on a back needle bed of the pair of needle beds, and according to the direction from the back center line to the left side seam, transversely knitting to form the second portion of the left back piece.

4. The method according to claim 1, wherein the step of knitting the left sleeve piece in the tubular knitting mode from the armhole comprises:
    knitting a front piece of the left sleeve piece on a front needle bed of the pair of needle beds from the armhole according to a direction from a sleeve top to a sleeve opening; and knitting a back piece of the left sleeve piece by using a same yarn carrier on a back needle bed of the pair of needle beds from the armhole according to the direction from the sleeve top to the sleeve opening, wherein, when the knitting reaches a sleeve seam during knitting of the back piece of the left sleeve piece, the back piece of the left sleeve piece is sewn with the front piece of the left sleeve piece at the sleeve seam.

5. The method according to claim 1, wherein the step of knitting the fully-shaped right piece of the upper garment on the flat knitting machine comprises:

knitting a right collar portion and a garment portion at the lower side of the right collar portion on the flat knitting machine in an open knitting mode, wherein the garment portion at the lower side of the right collar portion comprises a placket;

knitting a right shoulder portion and a garment portion at the lower side of the right shoulder portion on the flat knitting machine in a semi-open knitting mode, wherein the garment portion at the lower side of the right shoulder portion comprises a right armhole; and knitting a right sleeve piece in a tubular knitting mode from the armhole.

6. The method according to claim 5, wherein the step of knitting the right sleeve piece in the tubular knitting mode from the armhole further comprises:

knitting a front piece of the right sleeve piece by using the same yarn carrier on the back needle bed of the pair of needle beds from the armhole according to a direction from a sleeve top to a sleeve opening; and knitting a back piece of the right sleeve piece on the front needle bed of the pair of needle beds from the armhole according to the direction from the sleeve top to the sleeve opening, wherein, when the knitting reaches a sleeve seam during knitting of the back piece of the right sleeve piece, the back piece of the right sleeve piece is sewn with the front piece of the right sleeve piece at the sleeve seam.

7. The method according to claim 1, wherein the steps of respectively sewing the left piece and the right piece at the back center lines and the collar center lines comprises:

sewing the back center line of the left piece and the back center line of the right piece to form a garment portion;

sewing a front collar of the left piece and a back collar of the left piece at a left side seam of the collar to form a collar of the left piece;

sewing a front collar of the right piece and a back collar of the right piece at a right side seam of the collar to form a collar of the right piece; and sewing the collar of the left piece and the collar of the right piece at a collar center line of the collar to form the collar.

* * * * *